United States Patent
Rumph

(10) Patent No.: US 8,879,121 B2
(45) Date of Patent: Nov. 4, 2014

(54) FUZZY MATCH INTERPOLATED CACHING UTILIZED IN IMAGE-PROCESSSING APPLICATIONS

(71) Applicant: Xerox Corporation, Norwalk, CT (US)

(72) Inventor: David E. Rumph, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 13 days.

(21) Appl. No.: 13/854,243

(22) Filed: Apr. 1, 2013

(65) Prior Publication Data

US 2014/0293355 A1  Oct. 2, 2014

(51) Int. Cl.
*H04N 1/60*  (2006.01)

(52) U.S. Cl.
CPC .................................. *H04N 1/6019* (2013.01)
USPC ............................ 358/1.9; 358/3.27; 358/518

(58) Field of Classification Search
None
See application file for complete search history.

(56) References Cited

U.S. PATENT DOCUMENTS

| | | | |
|---|---|---|---|
| 5,689,255 A | 11/1997 | Frazier et al. | |
| 5,702,059 A | 12/1997 | Chu et al. | |
| 6,262,747 B1 * | 7/2001 | Rocheleau et al. | 345/620 |
| 6,345,117 B2 * | 2/2002 | Klassen | 382/167 |
| 6,594,030 B1 | 7/2003 | Ahlstrom et al. | |
| 6,707,569 B1 | 3/2004 | Kato et al. | |
| 6,738,159 B2 * | 5/2004 | Harrington | 358/1.9 |
| 6,781,720 B1 * | 8/2004 | Klassen | 358/3.27 |
| 6,970,271 B1 | 11/2005 | Estrada et al. | |
| 6,992,798 B2 * | 1/2006 | Geurts et al. | 358/3.15 |
| 7,123,381 B2 * | 10/2006 | Klassen | 358/1.9 |
| 7,606,314 B2 | 10/2009 | Coleman et al. | |
| 7,672,013 B2 | 3/2010 | Accad et al. | |
| 7,710,609 B2 * | 5/2010 | McElvain | 358/3.27 |
| 8,332,401 B2 | 12/2012 | Hull et al. | |
| 8,687,237 B2 * | 4/2014 | Komatsu et al. | 358/3.06 |
| 2006/0033960 A1 * | 2/2006 | Allen | 358/3.26 |
| 2006/0268296 A1 * | 11/2006 | McElvain | 358/1.9 |
| 2007/0103732 A1 * | 5/2007 | Lin et al. | 358/3.27 |

* cited by examiner

*Primary Examiner* — Dung Tran
(74) *Attorney, Agent, or Firm* — Kermit D. Lopez; Luis M. Ortiz; Ortiz & Lopez, PLLC

(57) ABSTRACT

Methods and systems for color conversion used in image-processing. In one approach, a caching strategy can be employed rather than a direct computation or a precomputed table. To improve the hit frequency and reduce storage requirements, a hash calculation in addition to comparison operations can be processed as a "near match" rather than an exact match. In another approach, "fuzzy match" caching can be implemented to reach the proper vicinity in the n-dimensional space, and then interpolation (or extrapolation) can refine the result.

20 Claims, 7 Drawing Sheets

NON IDEAL IMAGE
WITH MISREGISTRATION

FUZZY MATCH INTERPOLATED CACHING UTILIZED IN IMAGE-PROCESSSING APPLICATIONS

FIELD OF THE INVENTION

Embodiments are generally related to the field of mage-processing. Embodiments are additionally related to multidimensional interpolated lookup tables used for color conversions. Embodiments also relate to LRU (Least Recently Used) caching.

BACKGROUND

The layout of a page or graphic image depends upon combining "structured graphics" according to a pre-established graphic design. The structured graphics are contiguous regions of color, usually represented in a plurality of separation images, in turn representing a succession of graphic objects imaged on the printing medium (e.g., the "paper"). The objects so imaged are shapes which can be: isolated from each other, abut one another at one or more points, partially overlap one another, or completely overlap one another. The resulting printed page or graphic image is therefore made up of a patchwork of shapes representing the graphic objects, some of which are "clipped" (or hidden) by objects imaged later in the succession.

The result of abutting or overlapping shapes is a boundary between adjacent regions of color which, under ideal printing conditions, should have zero width. That is, the one color should stop exactly where the other begins with no new colors introduced along the boundary by the printing process itself. The "colors" which fill the shapes can be solid colors, tints, degrades, contone images, or "no fill" (i.e., the paper with no ink applied). In general, the "colors" represented in these adjacent regions are printed using more than one colorant. In practice therefore, the realization of a zero width boundary between regions of different color is impossible as a result of small but visible misregistration problems from one printed separation to another. The error is manifested as a "light leak" or as a visible boundary region of an undesired color.

As an example, FIG. 1A illustrates an ideal boundary between a red region on the right and a cyan region on the left, red being composed of a combination of magenta and yellow colorant, while FIG. 1B illustrates a non-ideal boundary, resulting from a slight misregistration of the magenta separation to the left on the page. Between the red and cyan regions is formed a blue line, from the unintended combination of cyan and magenta. On the right-hand side of the red region will be formed a yellow line, again resulting from a slight misregistration of the magenta separation to the left on the page.

The problem of misregistration is a mechanical problem almost always existing in printing systems. The problem arises because color separations are not laid exactly where intended, due to inherent imperfections in any separation registration process. It is somewhat correctable by mechanical registration methods; however, it is rarely completely correctable. In expensive, high end printing processes, customers have high expectations that misregistration artifacts will not be visible. In inexpensive, low end printers, mechanical registration techniques are so expensive as to make correction or trapping essential.

Methods for correcting this misregistration are known. The general approach is to expand one of the abutting regions' separations to fill the gap or misregistration border region with a color determined to minimize the visual effect when printed. Borders or edges expanded from a region of one color to another in this manner are said to be "spread". A border which has been expanded is referred to as a "trap", and the zone within which color is added is called the "trap zone".

Commonly used methods for automatic trapping of digital images fall into the categories of vector-based and raster-based methods. Vector-based methods rely on images that have been converted from a page-description language form, describing objects as characters, polygonal shapes, etc., into an internal data structure containing not only object information, but also a list of all the edges between regions of different color. Raster-based methods rely on images that have been first scanned or converted from page-description based form and are stored internally as a sequence of (high resolution) scan lines each containing individual scan elements or pixels. These methods process each raster line in sequence and compare one or more adjacent pixels to determine color boundaries. After some initial processing to find edges, both vector-based and raster-based methods apply rules for determining whether or not to create a trap at such boundaries, and finally apply a second set of rules to determine the nature of the trap if one is to be created.

FIG. 2 illustrates a high-level flow chart of operations depicting the basic prior art basic method 100 of trapping. In general, the trap process begins, as shown at block 102 in FIG. 2. It can be seen from FIG. 2 that most trapping processes take the following format which shall be referenced throughout this discussion. Following processing of the operation shown in block 102, an operation can be implemented to find an edge in the image, no matter how described. Then, as shown at decision block 105, a step can be performed to determine if the edge has been found. If not, then the process terminates, as depicted at block 107. If so, the process continues, as depicted next at decision block 106.

As shown in decision block 106 a test can be performed to determine if a trap should be inserted. If so, then the operations continue as shown next at block 108. If not ("No"), then the operation depicted at block 104 (i.e., find an edge) can be implemented again, followed by the operations illustrated at block 105 and so on. Assuming a "Yes" result with resect to the operation depicted at block 106, then an operation can be performed to determine the trap color, as described at block 108.

Following processing of the operation for determining the trap color (i.e., block 108), an operation can be implemented to determine the trap position. Assuming "Yes" result with respect to block 110, then an operation can be implemented, as shown at block 112, to modify the image.

Thereafter, the process shown at block 104 (i.e., find an edge) can be repeated and so forth.

It can thus be appreciated that a number of methods exist for computing the "traps" needed to compensate for misregistration of printing devices. Typically, the methods are partitioned into three independent steps: identifying boundaries from one colored region to another, determining whether a "trap" placed on that boundary would improve the appearance of the document in the face of expected mechanical misregistration, and inserting the trap into the page. The disclosed embodiments, however, are primarily concerned with the second step.

Many approaches to determining an appropriate trap color are very time consuming and best suited for applications where performance is not critical. Where performance is important, optimizations such as interpolated table-lookup have been used. One prior art approach is disclosed in U.S. Pat. No. 6,345,117 (Klassen), which is incorporated by reference herein and describes a method to automatically determine, given two input colors that are spatially adjacent, whether trapping would be beneficial, the best color to use for a trap, and where to place the trap with respect to the edge between the two input colors. The algorithm described in the Klassen patent involves considerable calculation and is not directly useable in high-speed digital printing. However, it is well-suited to prepopulate an interpolated table.

The number of interpolation nodes needed in a table, however, increases very quickly as additional dimensions of color (i.e., additional process separations) are added, necessitating significantly increased memory, or a reduction in the number of nodes per dimension (which reduces accuracy) or both, and a great increase in the calculations necessary to fill all the interpolation nodes.

As an example, the current FFPS interpolated trapping table supports 4-color separations, giving it eight independent color inputs (c, m, y, and k for each of the two colors across the boundary). A future product intends to support six process colors, which would mean extending the trapping table to 12 dimensions. Even just four nodes per dimension would require over 16 million nodes to be calculated or otherwise derived, stored, and accessed.

The use of multidimensional interpolated lookup tables is a well-known practice for color conversions, and several variants exist, including trilinear and tetrahedral interpolation. These techniques have also been extended to more than three or four dimensions, including in the current FFPS interpolated trapping table, which is an 8-dimension interpolated table.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image-processing methods and systems.

It is another aspect of the disclosed embodiments to provide for methods and systems for generating color traps used in image-processing.

The aforementioned aspects and other objectives and advantages can now be achieved as described herein. Methods and systems are disclosed herein for determining a trap color via a Fuzzy Match Cache Trapping approach. In general, for each dimension of an input having at least two input values, the two (or more) input values can be quantized, indicative of a pair of colors that define a center point of a hypercube that a cached node will represent. The quantized input values can be combined into a cache lookup using a selected hash function. A lookup can then be provided via the cache lookup and with respect to the cached node utilizing the selected hash function such that if the cache lookup provides a match, the cached node contains a correct result with respect to a cell center allowing the cached node to be utilized not only for exact input colors but also for nearby colors, thereby increasing a frequency of matches and enhanced efficiency in the trapping process. In some embodiments, if the lookup misses, the cached node can be populated with appropriate content on demand from an underlying algorithm.

Methods and systems are also disclosed for determining a trap color based on a Fuzzy Match Interpolated Caching approach. In such an approach, an original input value can be quantized with respect to each dimension of input data associated to produce at least one quantized input value and thereafter calculate the difference in dimension between the quantized input value and the original input value. The quantized input value(s) can be combined into a lookup table utilizing a selected hash function comprising one or more hash keys to cache lookup a cached node containing a correct result for a cell center and extrapolation data in the each dimension to permit extrapolating from the cell center based on a distance in the input data from the cell center. The one or more extrapolated output values can be calculated with respect to the extrapolation data appropriate to a dimension of an output thereof.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein: rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 3:
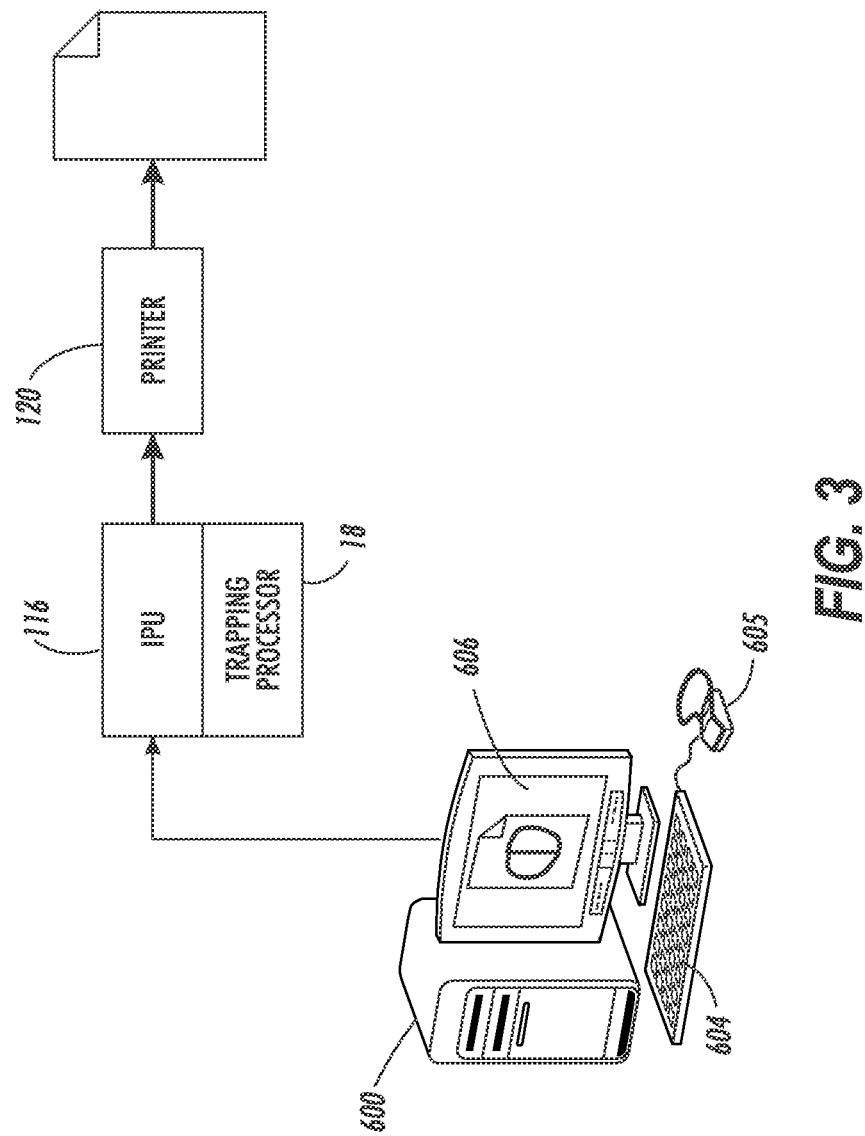
FIG. 3 shows a printing system, in which one example of the present invention might be implemented.

Referring now to the drawings where the showings are for the purpose of describing an embodiment of the invention and not for limiting same, a basic image processing system is shown in FIG. 3, where in some cases, gray image data may be characterized as image signals, each pixel of which can be defined at a single level or optical density in set of optical density levels.

As used herein, a "pixel" refers to an image signal associated with a particular position in an image, having a density between a minimum and a maximum. Accordingly, intensity and position define pixels. In the particular color system to be discussed, color documents are represented by multiple sets of image signals, each set (or separation) represented by an independent channel, which is usually processed independently. A "color image" as used herein is therefore a document including at least two separations, or sometimes more than 4 separations (sometimes referred to as "hifi color").

Each separation provides a set of image signals or separation pixels, which will drive a printer to produce one color separation of the image. In the case of multicolor printers, the separations, superposed together, form the color image. In this context, we will describe pixels as discrete image signals, which represent optical density of the document image in a given small area thereof. The term "separation pixel" will be used to refer to such an image signal in each separation, as distinguished from "color pixel", which is the sum of the color densities of corresponding pixels in each separation.

"Gray", as used herein, does not refer to a color unless specifically identified as such. Rather, the term refers to image signals, which vary between maximum and minimum, irrespective of the color of the separation in which the signals are used. Documents may include plural "objects". An object is a discrete image element, which may be processed distinctly from the remainder of the document. Objects commonly fall into types including, for example, photographs, graphics, text, shadings, etc. High quality systems process objects of different types distinctly, for optimum rendition of each type.

FIG. 3 illustrates a general system, which can be implemented in accordance with particular embodiments. An electronic representation of a document (hereinafter, an image) is shown displayed within a display 606 of a computer 600. Such an image or document may be, for example, a document configured from a Page Description Language, such as a PDF or PostScript document. Such a document may be a scanned document (e.g., rendered via a scanner). Alternatively, the image may be generated with appropriate image generation software at a computer or workstation 600 (which in some cases is associated with a display 606, keyboard 604, and mouse 605).

Since it is assumed that this is a color document, the image can be defined with two or more separation bitmaps, usually with identical resolution and pixel depth. The electronic image signals can be directed through an IPU (Image Processing Unit) 116 to be processed so that an image suitable for reproduction on image output terminal or printer 120 can be obtained. Of course, the IPU 116 could represent a software program in a general purpose digital computer. For the purposes of this discussion, image processing unit 116 may include a trapping processor 18 which corrects for traps formed at color edges.

Figure 1A:
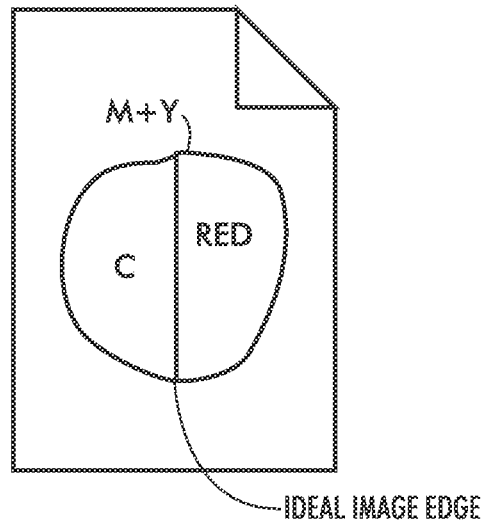
FIGS. 1A and 1B illustrate the problems of misregistration at edges in color images.
Figure 1B:
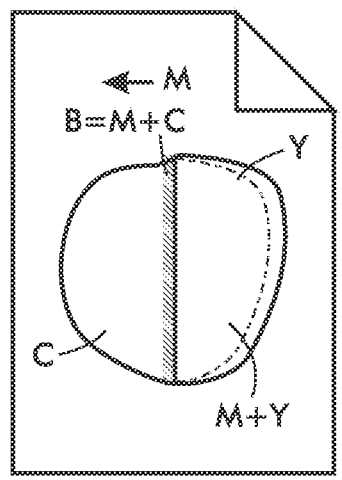
Figure 2:
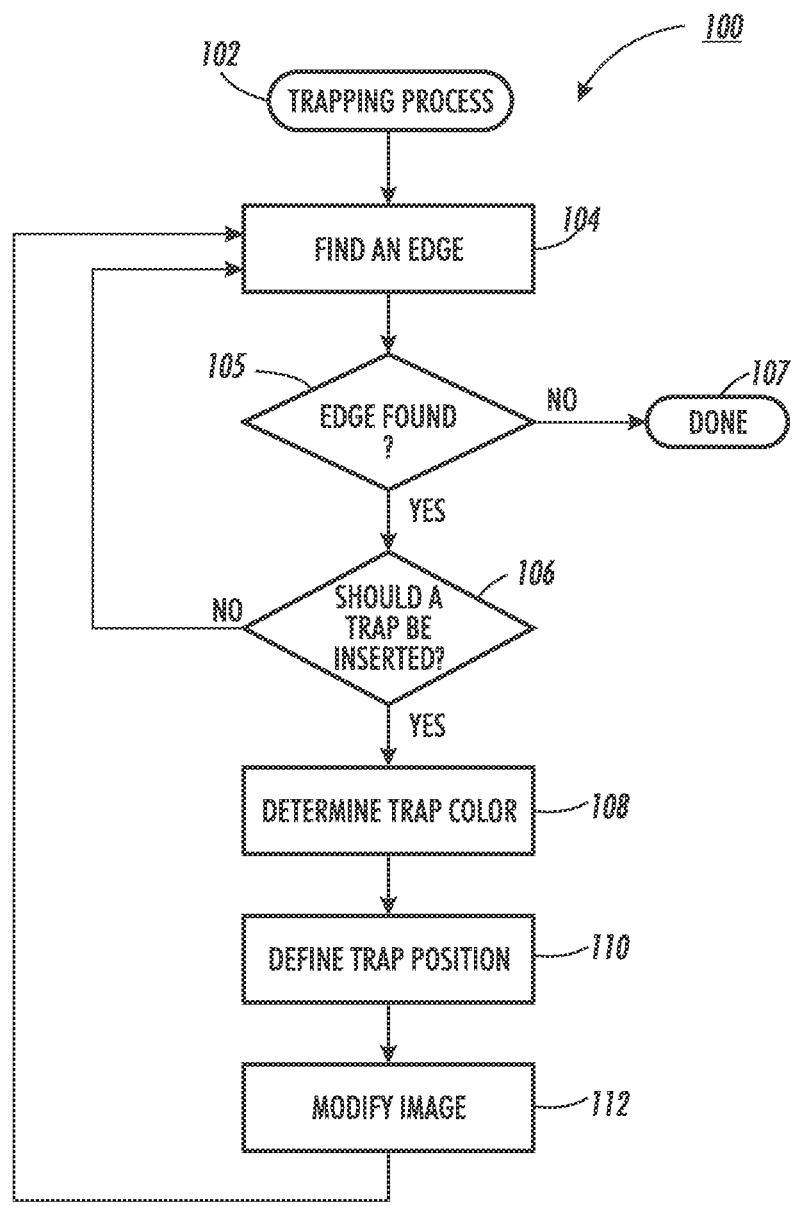
FIG. 2 illustrates a high-level flow chart of operations depicting the basic prior art method of trapping.

FIGS. 1A and 1B discussed earlier herein illustrate the problem of trapping. In an ideal image, changes in colors occur exactly at a preplanned location, as shown in FIG. 1A. However, misregistration, common in real world devices using plural separations independently printed, often results in a visible image artifact or defect, as shown in FIG. 1B. Such defects can be compensated for with trapping.

Trapping usually takes place in which: a) for any pair of colors (which may or may not correspond to an edge), a decision must be made b1) whether to trap; if so, b2) which color to use for the "trap color" (the color to interpose between the colors of the pair); and b3) where to place the chosen trap color. In accordance with the invention, the decision to trap is based on the visibility of the worst artifact that could happen. Thus, the decision to trap is based on the visibility of the worst of all possible misregistration errors between the input colors. Subsequently, trap colors are chosen based on the visibility of the added trap color against each of the original colors and based on the visibility of misregistration-induced colors against each of the original colors.

As has been discussed, trapping is a phenomenon of non-ideal printing devices. Trapping characteristics vary from printing technology to printing technology. In accordance with another aspect of the invention, information about the printing technology, or even regarding a particular printer, may be used to optimize the trapping process.

Initially, one embodiment will be described with reference to the flow chart of FIG. 4. Another embodiment is described with reference to the flow chart of FIG. 5. Such flow charts are readily convertible to a program running on a general purpose digital computer or a special purpose processor configured to provide such operations.

Figure 4A:
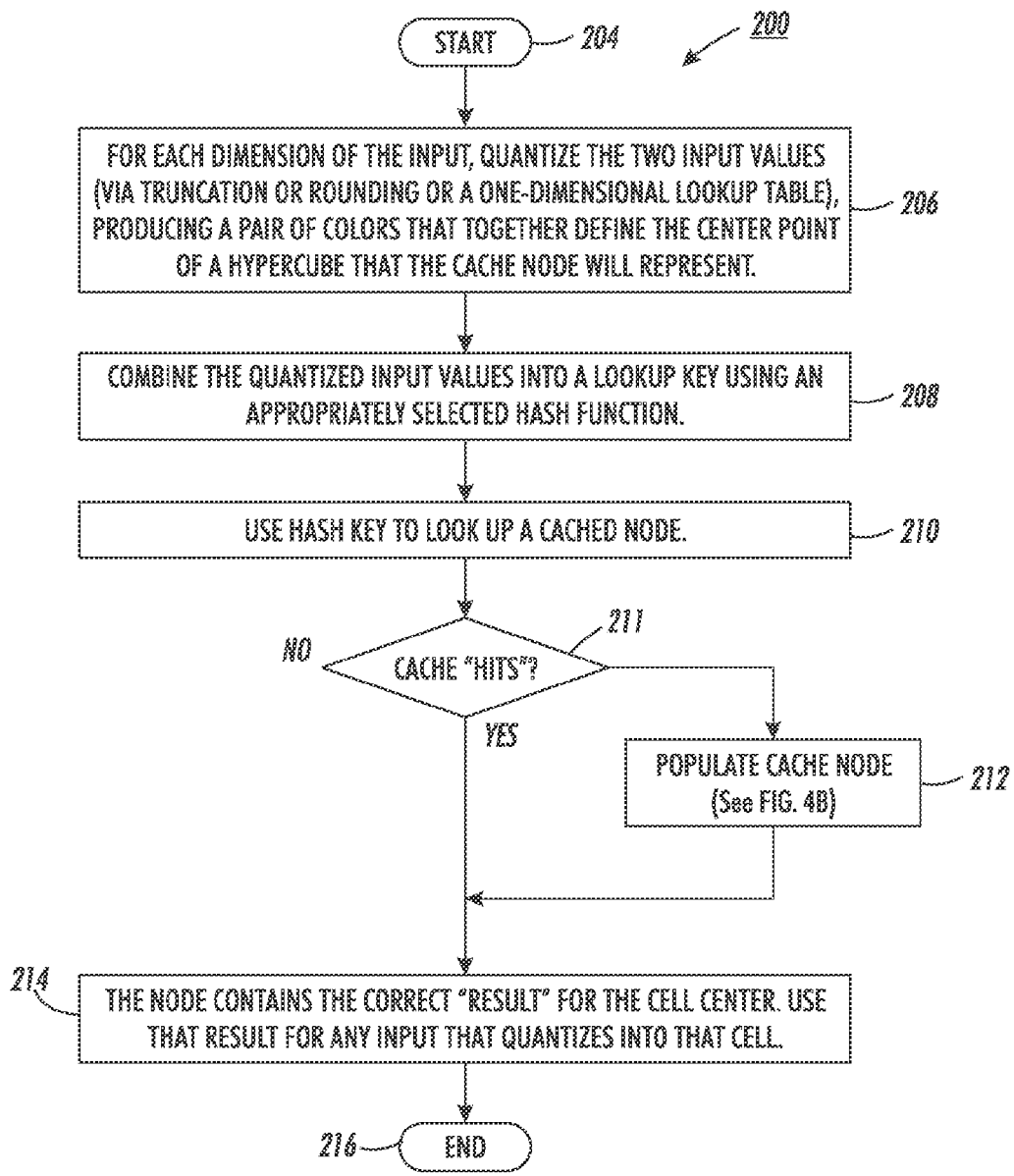
FIGS. 4(a) and 4(b) illustrate a high-level flow charts chart of operations illustrating logical operational steps of a method for fuzzy match cache trapping, in accordance with an embodiment.
Figure 4B:
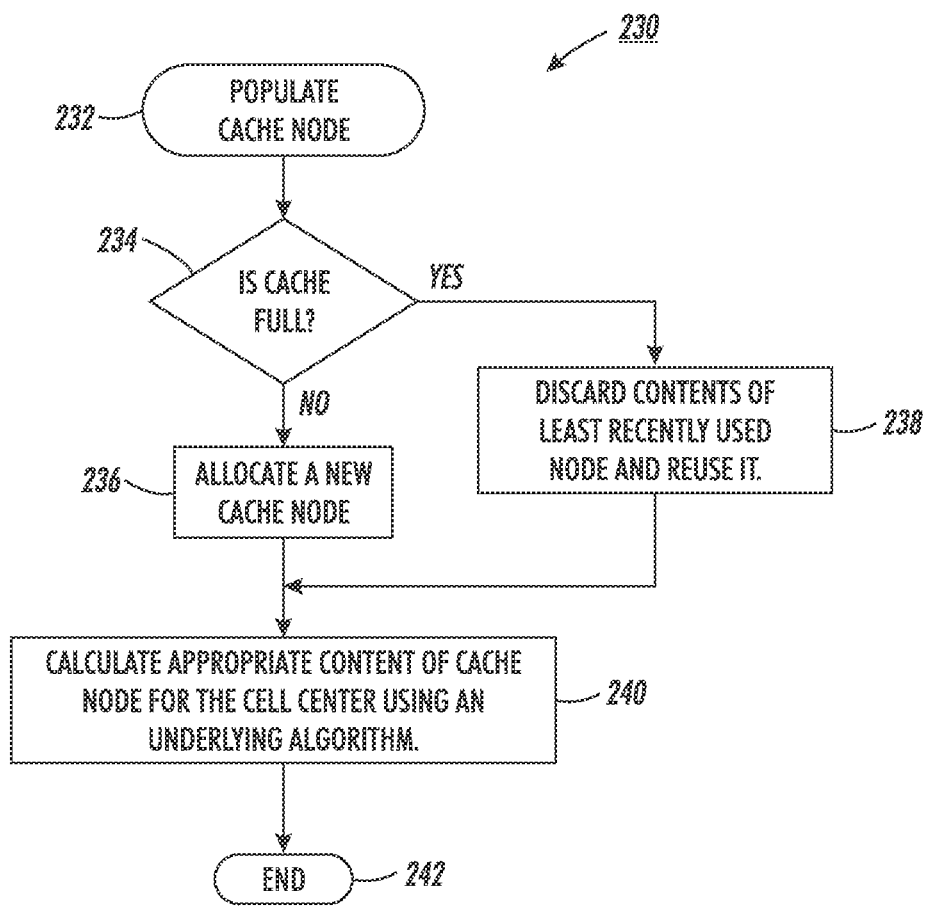

FIGS. 4(a) and 4(b) respectively illustrate high-level flow charts of operations depicting logical operational steps of methods 200 and 230 for fuzzy match cache trapping, in accordance with the disclosed embodiments. The respective methods 200 and 230 of FIGS. 4(a) and 4(b) employ a caching strategy rather than direct computation or a precomputed table. As will be demonstrated shortly, to improve the hit frequency and reduce storage requirements, the hash calculation and comparison are "near match" rather than an exact match.

In order to appreciate how methods 200 and/or 230 operate, it is important to appreciate that LRU (Least Recently Used) caching is a well-known technique for increasing performance of complex calculations that are repeated many times. However, in a many-dimensional space, the reuse of a given node drops dramatically because the vast number of possible nodes makes hitting any one node statistically rare. The techniques shown in FIGS. 4(a) and 4(b) can therefore provide a technique that can be implemented where a cache node is used not only for the exact input colors, but nearby colors as well, increasing the frequency of "hits".

As indicated at block 204, the process can be initiated. Then, as shown at block 206, for each dimension of the input, the two input values can be quantized (via truncation or rounding or a one-dimensional lookup table), thereby producing a pair of N-dimensional colors that together define the center point of a hypercube that the cache node will represent. Next, as described at block 208, the quantized input values can be combined into a lookup key using an appropriately selected hash function. Thereafter, as depicted at block 210, an operation can be processed to use the lookup key to look up a cached node in the usual way.

If the cache "hits", as shown at decision block 211 (i.e., see "YES" output from decision block 211), then the node contains the correct "result" for the cell center as indicated at block 214, and that result can be used for any input that quantizes into that cell. If the result with respect to the decision block 211 is "NO", then the operation depicted at block 212 is performed, wherein the cache node is populated (i.e., see FIG. 4(b), which illustrates the logical operations for populating the cache node). Following processing of the operation shown at block 214, the process then terminates, as depicted at block 216. Note that the node will be populated as shown in FIG. 4(b) with the appropriate content on demand from an underlying algorithm, which is typically much more computationally expensive than the calculation of the hash key and extrapolation.

As is typical in caching schemes, a "least recently used" algorithm and a cache size limit can be used to flush nodes out of the cache if it gets full. In this case, if the cache is full the least recently used node can be flushed to provide room for the new node, but may need to be recalculated and re-cached if it is required later. Otherwise (i.e., if the cache is not full), the newly calculated node can be entered into the cache without displacing another node. As shown at block 232 of method 230 in FIG. 4(b), the operations for populating the cache node can be implemented. A decision block 234 illustrates an operation for determining if the cache is full. If so ("Yes"), then the operation depicted at block 238 can be processed to discard the contents of the least recently used node and reuse it. If the result of the operation shown at decision block 234 is "No", then the operation depicted at block 236 can be implemented wherein a new cache code is allocated. Thereafter, as indicated at block 240, an operation can be processed to calculate appropriate content of cache node for the cell center using an underlying algorithm. The process can then terminate (i.e., "END" block 242).

Overall efficiency is dependent on node spacing, among other things, and represents a tuning parameter. Input quantization needs to be coarse enough to gain the benefit of the lower cost of hash formation as compared to the direct execution of the underlying algorithm, but not so coarse as to lead to visible artifacts. In general, caching typically requires an exact match. This approach takes advantage of the fact that small differences in color can be accommodated by the same trap color. Benefits of the methods 200 and 230 shown in FIGS. 4(a) and 4(b) include, for example, enhanced performance and reduced memory usage.

Figure 5A:
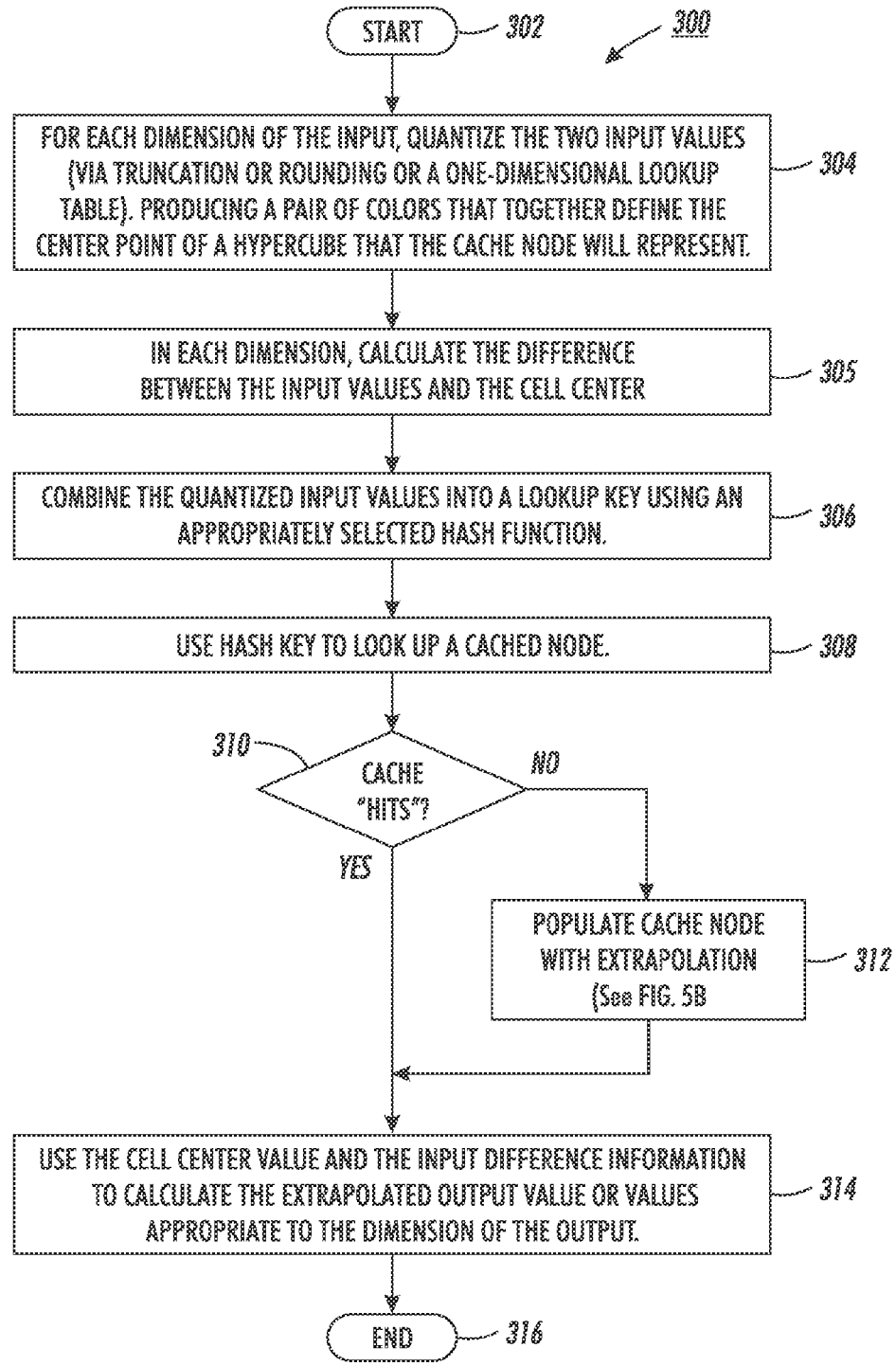
FIGS. 5(a) and 5(b) illustrate high-level flow charts of operations illustrating logical operational steps of a method for fuzzy match interpolated caching, in accordance with an alternative embodiment.
Figure 5B:
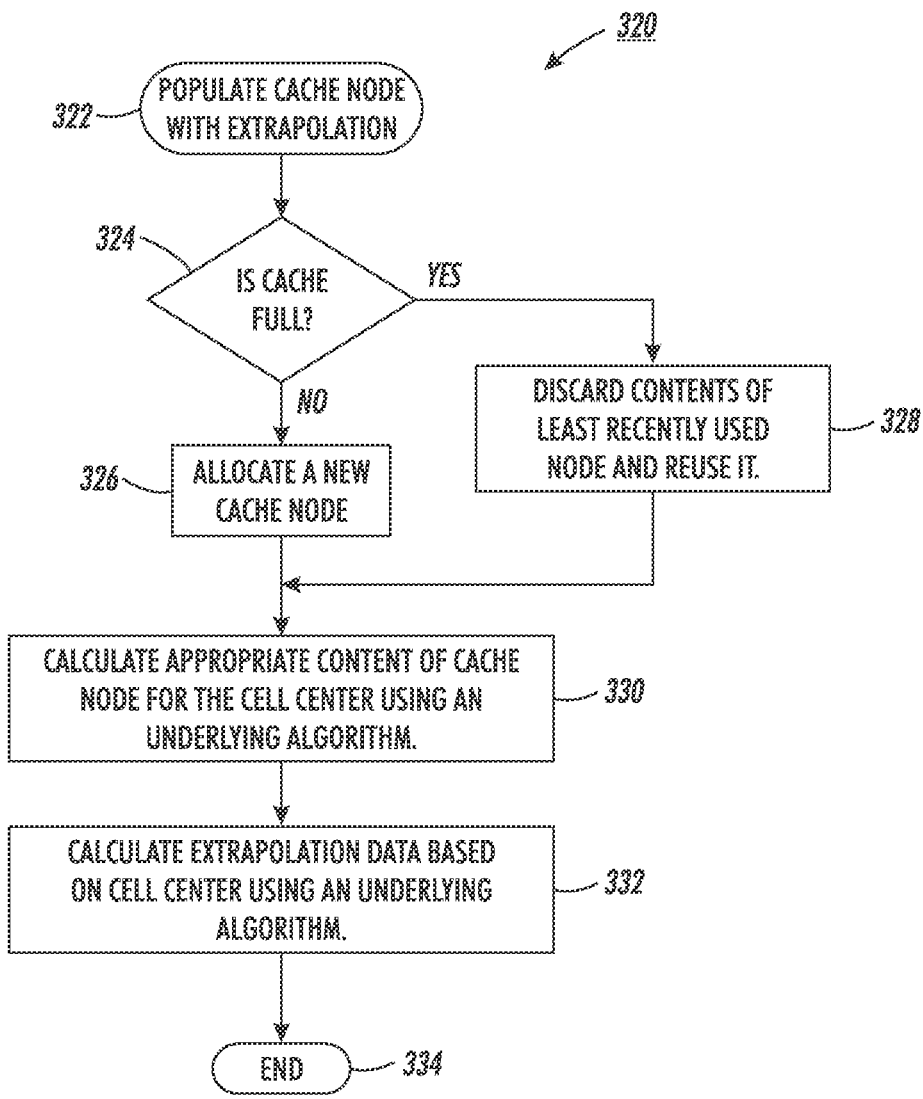

FIGS. 5(a) and 5(b) respectively illustrate high-level flow charts of operations depicting logical operational steps of methods 300 and 320 for fuzzy match interpolated caching, in accordance with an alternative embodiment. The approach shown in FIGS. 5(a) and 5(b) take advantage of the fact that both interpolated table lookup and LRU caching techniques can increase the performance of complex calculations that are repeated many times. Each technique has its own advantages and areas of applicability. This approach can be thought of a hybrid of both techniques, utilizing "fuzzy match" caching (e.g., such as the approach shown in FIGS. 4(a) and 4(b)) to get to the proper vicinity in the n-dimensional space, and then interpolation (or extrapolation) to refine the result.

Thus, as shown at block 302 of FIG. 5(a), the process begins. Then, as depicted at block 304, for each dimension of the input, the input value can be quantized (e.g., using truncation or rounding or a one-dimensional lookup table) thereby producing a pair of colors that together define the center point of a hypercube that the cache node will represent. Next as shown at block 305, in each dimension the difference between the input values and the cell center can be calculated. Thereafter, as described at block 306, an operation can be performed to combine the quantized input values into a lookup key using an appropriately selected hash function. Next, as described at block 308, the lookup key can be employed to look up a cached node in the usual way.

Note that the node contains the correct "result" for the cell center, and extrapolation data in each dimension to enable extrapolating from the cell center based on distance in the input data from the cell center. (For simplicity, FIG. 5(a) does not show the branch where the cache lookup indicates that no trapping is needed.) Decision block 310 illustrates an operation for determining if the cache "hits". If the answer is "no", then as shown at block 312, an operation(s) can be implemented to populate the cache node with extrapolation. FIG. 5(b) illustrates this process in further detail. Assuming the result with respect to decision block 310 is "yes", then the operation shown at block 314 is processed to use the cell center value and the input difference information to calculate the extrapolated output value or values appropriate to the dimension of the output. The process can then terminate as depicted at block 316.

FIG. 5(b) illustrates operations of a method 320 for populating cache node with extrapolation data. The process begins as shown at block 322. A decision block 324 indicates an ration for determining if the cache is full. If the cache is full, then an operation can be implemented, as shown at block 328 to discard the contents of the least recently used node and reuse. If the cache is not full then an operation can implemented as shown at block 326 to allocate a new cache node. Following processing of the operations shown at blocks 326 or 328, an operation can be implemented to calculate the appropriate content of the cache node for the cell center using an underlying algorithm, as illustrated at block 330. Thereafter, an operation can be implemented to calculate extrapolation data based on the cell center using an underlying algorithm, as illustrated at block 332. The process can then terminate, as shown at block 334.

The overall efficiency of this approach is dependent on node spacing, among other factors, and represents a tuning parameter. Input quantization needs to be coarse enough to gain the benefit of the lower cost of hash formation and extrapolation as compared to the direct execution of the underlying algorithm, but not so coarse as to lead to visible artifacts. The extrapolation information may include references to adjacent nodes, for example, in the form of hash keys. If so, the cache lookup of these nodes may also "miss" and they will need to be calculated on demand.

Note that the approach shown in FIGS. 5(a) and 5(b) potentially produces better results than the related "Fuzzy Match Cache Trapping" of FIGS. 4(a) and 4(b) and the nodes can cover a larger area of color space while still producing good quality traps, so the likelihood of cache hits is increased at the cost of additional computation of the extrapolation, and the space to store the extrapolation data in each cache node.

As will be appreciated by one skilled in the art, the disclosed embodiments can be implemented as a method, data-processing system, or computer program product. Accordingly, the embodiments may take the form of an entire hardware implementation, an entire software embodiment or an embodiment combining software and hardware aspects all generally referred to as a "circuit" or "module." Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures. It will be understood that each block of the illustrations, and/or combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in the block or blocks discussed herein such as the various instructions shown with respect to, for example, particular blocks shown in FIGS. 4-5.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for computing trap values used in image-processing, said method comprising:
   for each dimension of an input having at least two input values, quantizing said at least two input values using an image processor to produce quantized input values indicative of a pair of colors that define a center point of a hypercube that a cached node will represent;
   combining said quantized input values into a cache lookup using a selected hash function; and
   providing a lookup via said cache lookup with respect to said cached node utilizing said selected hash function, such that if said cache lookup provides a match, said cached node contains a correct result with respect to a cell center thereby allowing said cached node to be utilized not only for exact input colors but also for nearby colors, thereby increasing a frequency of matches and enhanced efficiency in a color conversion used in image processing.

2. The method of claim 1 wherein if said lookup misses, said cached node is populated with appropriate content on demand from an underlying algorithm.

3. The method of claim 1 wherein said cached node is capable of being recalculated and reached.

4. The method of claim 2 wherein said underlying algorithm comprises a least recently used algorithm.

5. A method for computing trap values used in image-processing, said method comprising:
   quantizing an original input value with respect to each dimension of input data associated to produce at least one quantized input value and thereafter calculate a difference in dimension between said at least one quantized input value and said original input value;
   combining said at least one quantized input value into a lookup table utilizing a selected hash function comprising at least one hash key to cache lookup a cached node containing a correct result for a cell center and extrapolation data in said each dimension to permit extrapolating from said cell center based on a distance in said input data from said cell center; and
   calculating at least one extrapolated output value with respect to said extrapolation data appropriate to a dimension of an output thereof.

6. The method of claim 5 wherein if said cache lookup misses, said cached node is populated with appropriate content on demand from an underlying algorithm.

7. The method of claim 5 further comprising quantizing said original input value utilizing a truncation approach.

8. The method of claim 5 further comprising quantizing said original input value utilizing a rounding approach.

9. The method of claim 5 further comprising quantizing said original input value utilizing said lookup table, wherein said lookup table comprises a one-dimensional lookup table.

10. The method of claim 9 wherein if said cache lookup misses, said cached node is populated with appropriate content on demand.

11. The method of claim 6 further comprising quantizing said original input value utilizing a truncation approach or a rounding approach.

12. A system for computing trap values used in image-processing, said system comprising:
   a processor;
   a data bus coupled to said processor; and
   a computer-usable medium embodying computer program code, said computer-usable medium being coupled to said data bus, said computer program code comprising instructions executable by said processor and configured for:
      each dimension of an input having at least two input values, quantizing said at least two input values to produce quantized input values indicative of a pair of colors that define a center point of a hypercube that a cached node will represent;
      combining said quantized input values into a cache lookup using a selected hash function; and
      providing a lookup via said cache lookup with respect to said cached node utilizing said selected hash function, such that if said cache lookup provides a match, said cached node contains a correct result with respect to a cell center thereby allowing said cached node to be utilized not only for exact input colors but also for nearby colors, thereby increasing a frequency of matches and enhanced efficiency in a color conversion used in image processing.

13. The system of claim 12 wherein if said lookup misses, said cached node is populated with appropriate content on demand from an underlying algorithm.

14. The system of claim 12 wherein said cached node is capable of being recalculated and reached.

15. The system of claim 13 wherein said underlying algorithm comprises a least recently used algorithm.

16. A system for computing trap values used in image-processing, said system comprising:
   a processor;
   a data bus coupled to said processor; and
   a computer-usable medium embodying computer program code, said computer-usable medium being coupled to said data bus, said computer program code comprising instructions executable by said processor and configured for:
      quantizing an original input value with respect to each dimension of input data associated to produce at least one quantized input value and thereafter calculate a difference in dimension between said at least one quantized input value and said original input value;
      combining said at least one quantized input value into a lookup table utilizing a selected hash function comprising at least one hash key to cache lookup a cached node containing a correct result for a cell center and extrapolation data in said each dimension to permit extrapolating from said cell center based on a distance in said input data from said cell center; and
      calculating at least one extrapolated output value with respect to said extrapolation data appropriate to a dimension of an output thereof.

17. The system of claim 16 wherein if said cache lookup misses, said cached node is populated with appropriate content on demand from an underlying algorithm.

18. The system of claim 16 further comprising quantizing said original input value utilizing a truncation approach.

19. The system of claim 16 further comprising quantizing said original input value utilizing a rounding approach.

20. The system of claim 16 further comprising quantizing said original input value utilizing said lookup table, wherein said lookup table comprises a one-dimensional lookup table.

\* \* \* \* \*